US012566270B2

(12) United States Patent
Kim

(10) Patent No.: US 12,566,270 B2
(45) Date of Patent: Mar. 3, 2026

(54) APPARATUS FOR ASSISTING DRIVING OF VEHICLE AND METHOD THEREOF

(71) Applicant: HL KLEMOVE CORP., Incheon (KR)

(72) Inventor: Daejong Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 983 days.

(21) Appl. No.: 17/718,679

(22) Filed: Apr. 12, 2022

(65) Prior Publication Data

US 2022/0334258 A1 Oct. 20, 2022

(30) Foreign Application Priority Data

Apr. 20, 2021 (KR) ........................ 10-2021-0051193

(51) Int. Cl.
*G01S 17/89* (2020.01)
*G01S 7/497* (2006.01)
(Continued)

(52) U.S. Cl.
CPC .............. *G01S 17/89* (2013.01); *G01S 7/497* (2013.01); *G06T 7/73* (2017.01); *B60W 2050/0083* (2013.01); *B60W 2420/403* (2013.01); *B60W 2420/408* (2024.01); *G06T 2207/20084* (2013.01)

(58) Field of Classification Search
CPC ........ G01S 17/89; G01S 7/497; G01S 7/4802; G01S 7/4808; G01S 13/865; G01S 13/867; G01S 13/931; G01S 17/86; G01S 17/931; G06T 7/73; G06T 2207/20084; G06T 2207/10016; G06T 2207/10028; G06T 2207/20081; G06T 2207/30252; G06T 7/33; G06T 7/0002; G06T 5/80;

G06T 7/11; G06T 2207/10; B60W 2050/0083; B60W 2420/403; B60W 2420/408; B60W 40/02;
(Continued)

(56) References Cited

U.S. PATENT DOCUMENTS

| | | | |
|---|---|---|---|
| 10,776,673 B2 | 9/2020 | Kim et al. | |
| 11,610,337 B2 * | 3/2023 | Habib ..................... | G01S 17/89 |
| 2021/0295561 A1 * | 9/2021 | Abbeloos ............... | G06V 20/56 |

FOREIGN PATENT DOCUMENTS

| | | | |
|---|---|---|---|
| KR | 10-1899549 B1 | 9/2018 | |
| WO | WO-2019093136 A1 * | 5/2019 ............. | G01B 11/00 |

OTHER PUBLICATIONS

Office Action issued Aug. 16, 2023 for counterpart Korean Patent Application No. 10-2021-0051193 (See English Translation).

* cited by examiner

*Primary Examiner* — Neil R McLean
(74) *Attorney, Agent, or Firm* — Hauptman Ham, LLP

(57) ABSTRACT

Provided is an apparatus for assisting driving of a vehicle, the apparatus including: a camera mounted on the vehicle and configured to have a front field of view of the vehicle and acquire image data; a lidar mounted on the vehicle and configured to have a front-side field of view of the vehicle and acquire lidar data; and a controller configured to process at least one of the image data or the lidar data, wherein the controller includes a calibration matrix for correcting the image data and the lidar data and is configured to: obtain a feature map of the image data and a feature map of the lidar data using machine learning; correct the calibration matrix based on a difference between the feature map of the image data and the feature map of the lidar data; and correct the image data and the lidar data using the corrected calibration matrix.

19 Claims, 6 Drawing Sheets

(51) Int. Cl.
    *G06T 7/73*         (2017.01)
    *B60W 50/00*     (2006.01)

(58) Field of Classification Search
    CPC . B60W 2050/0002; G06N 3/08; G06N 20/00;
                    B60R 11/04; H04N 23/57
    USPC ......................................................... 382/190
    See application file for complete search history.

[FIG. 1]
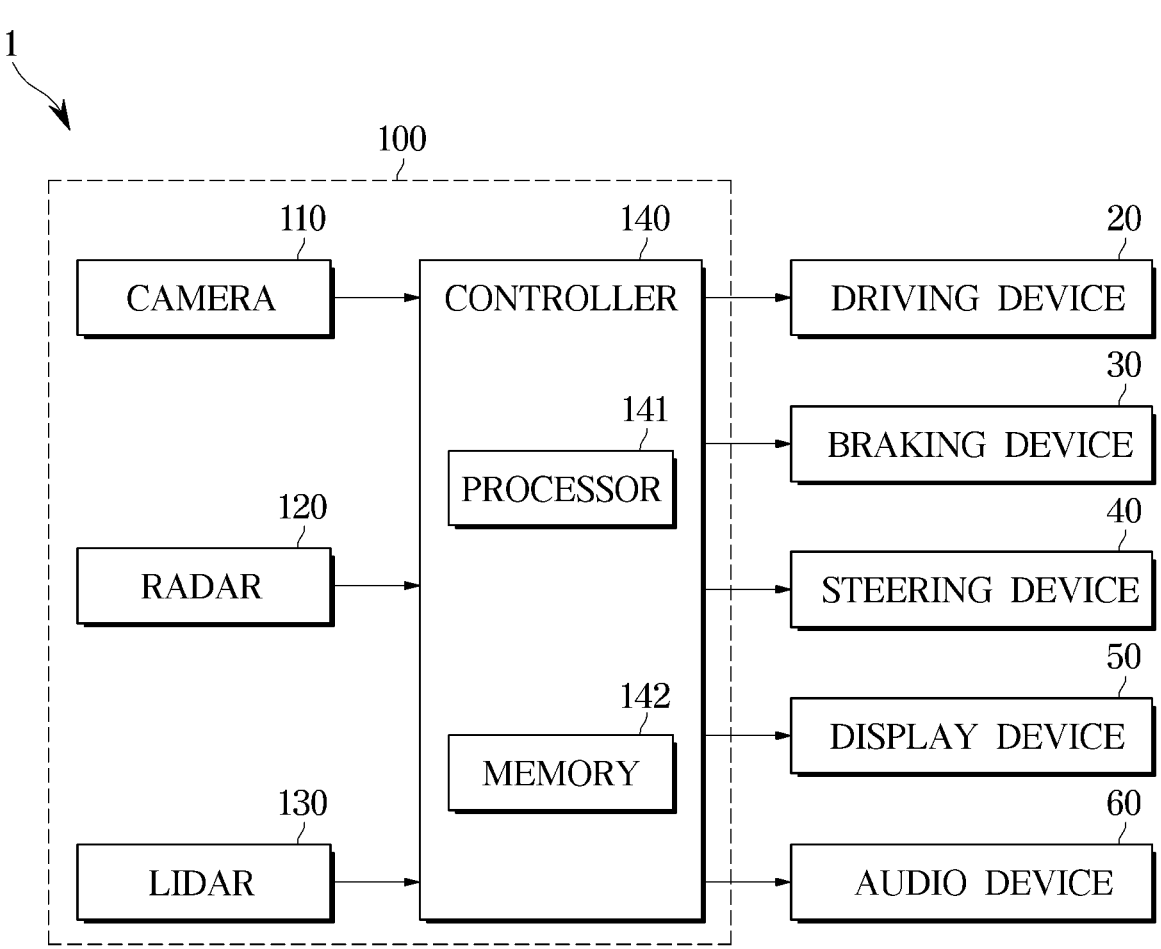

[FIG. 2]
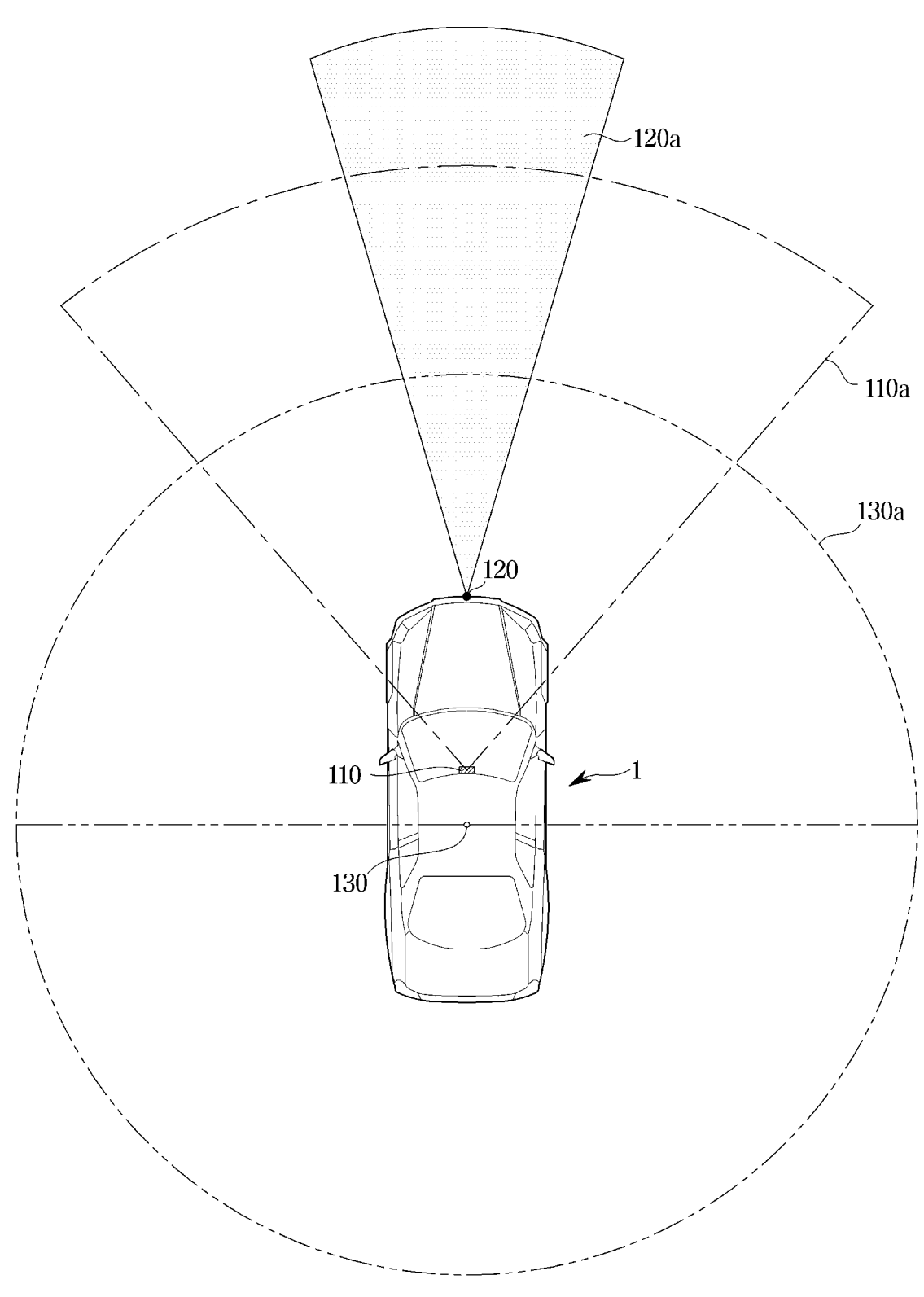

[FIG. 3]
140
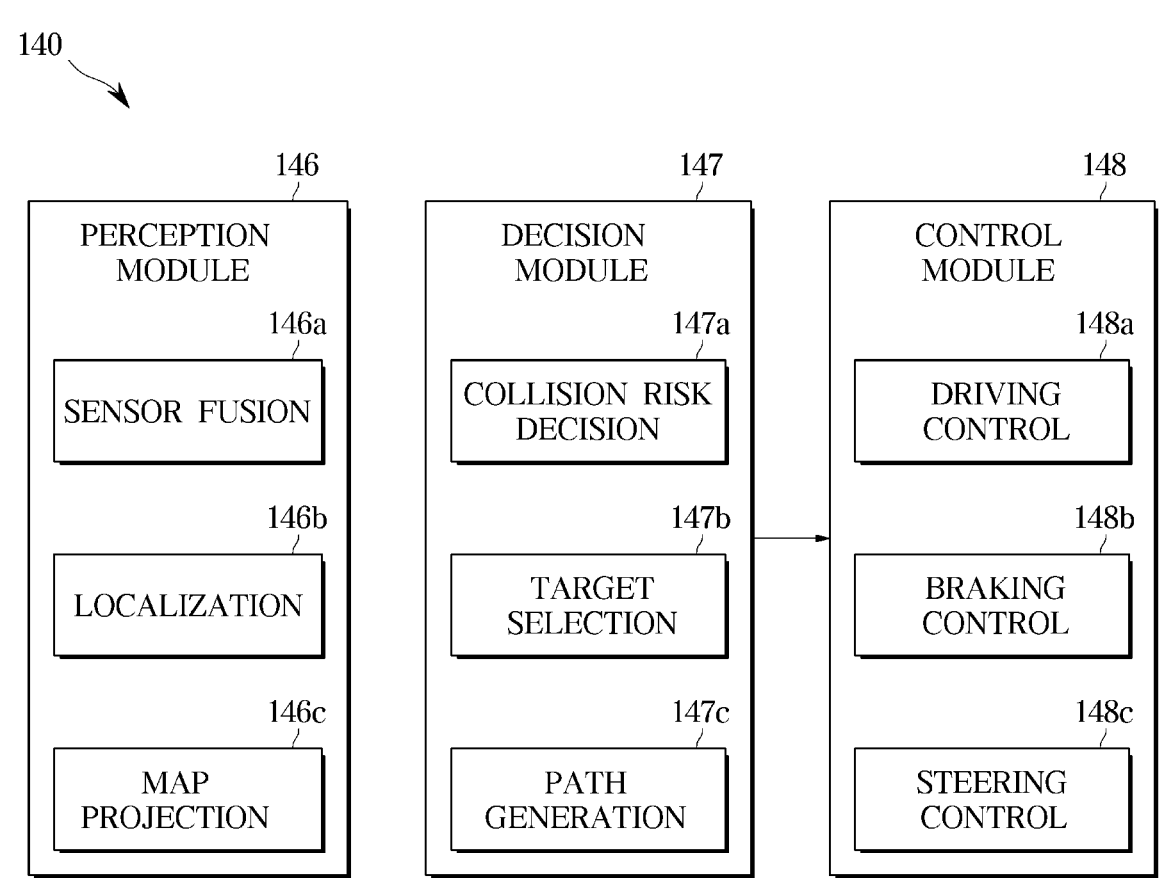

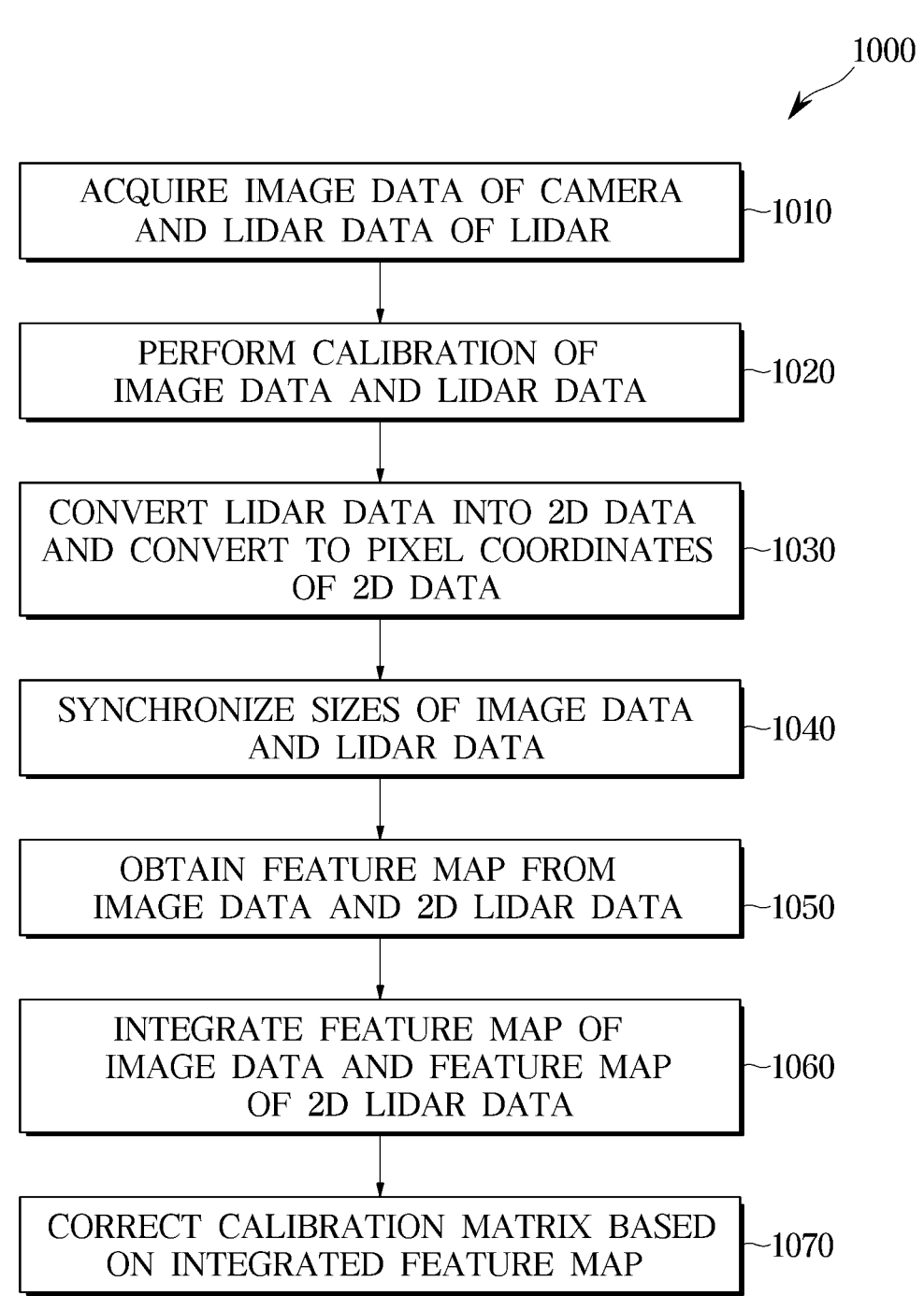

| | |
|---|---|
| ACQUIRE IMAGE DATA OF CAMERA AND LIDAR DATA OF LIDAR | ~1010 |
| PERFORM CALIBRATION OF IMAGE DATA AND LIDAR DATA | ~1020 |
| CONVERT LIDAR DATA INTO 2D DATA AND CONVERT TO PIXEL COORDINATES OF 2D DATA | ~1030 |
| SYNCHRONIZE SIZES OF IMAGE DATA AND LIDAR DATA | ~1040 |
| OBTAIN FEATURE MAP FROM IMAGE DATA AND 2D LIDAR DATA | ~1050 |
| INTEGRATE FEATURE MAP OF IMAGE DATA AND FEATURE MAP OF 2D LIDAR DATA | ~1060 |
| CORRECT CALIBRATION MATRIX BASED ON INTEGRATED FEATURE MAP | ~1070 |

[FIG. 5]
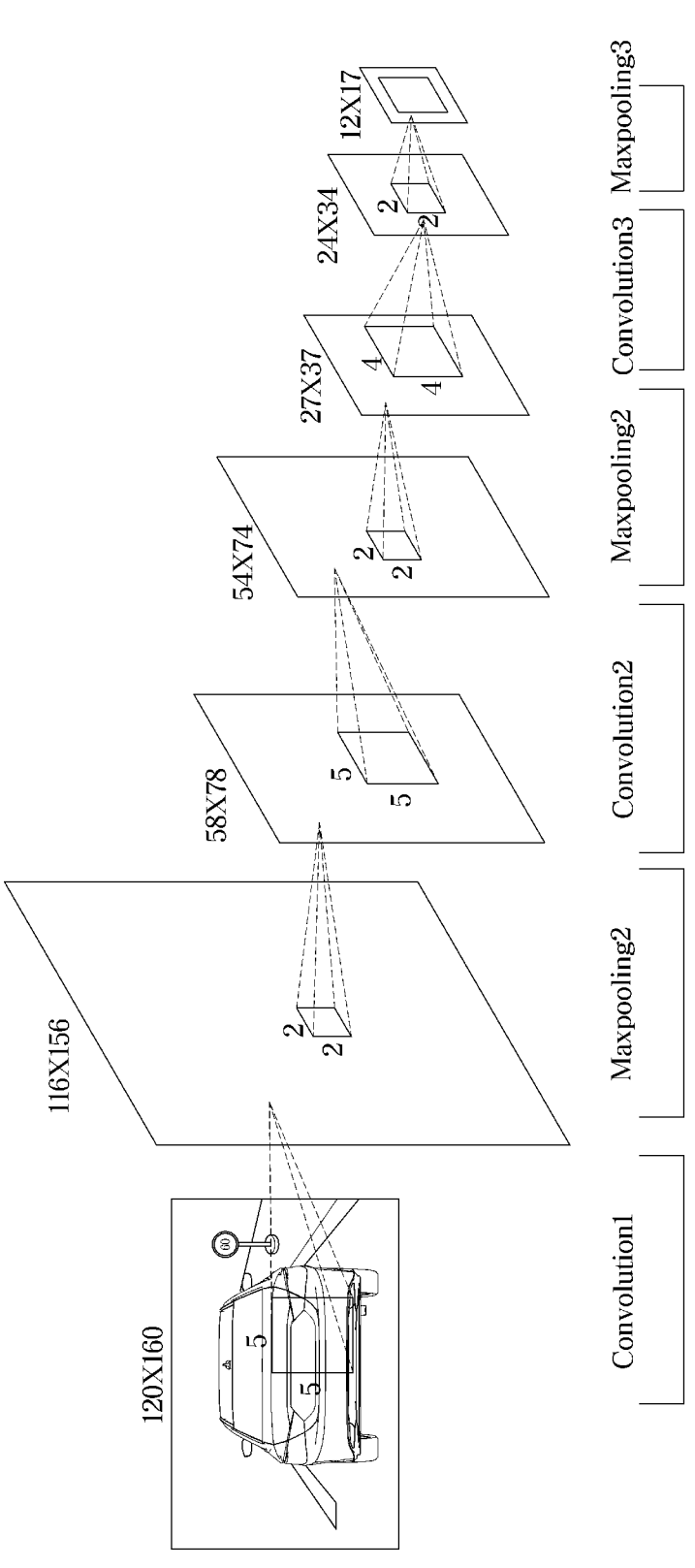

[FIG. 6]
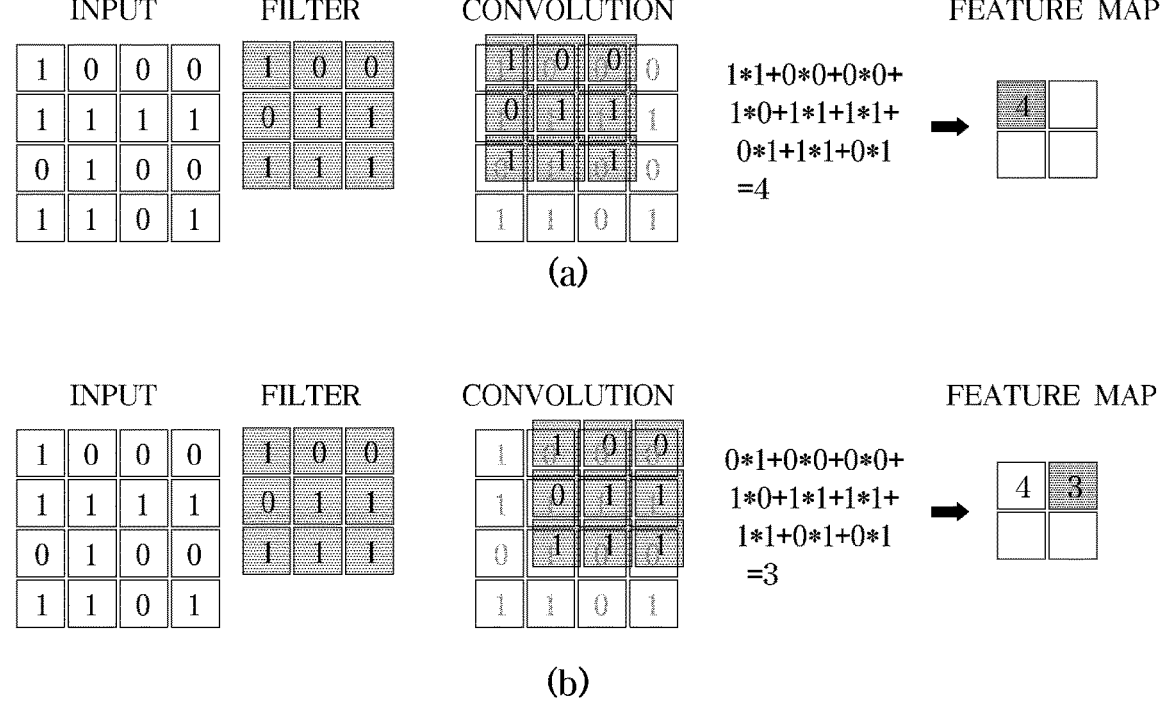

APPARATUS FOR ASSISTING DRIVING OF VEHICLE AND METHOD THEREOF

CROSS-REFERENCE TO RELATED APPLICATION

This application is based on and claims priority under 35 U.S.C. § 119 to Korean Patent Application No. 10-2021-0051193, filed on Apr. 20, 2021 in the Korean Intellectual Property Office, the disclosure of which is incorporated herein by reference.

BACKGROUND

1. Technical Field

The disclosure relates to an apparatus for assisting driving of a vehicle and a method thereof, and more particularly, to an apparatus for assisting driving of a vehicle including a camera and a lidar and a method thereof.

2. Background Art

As the most common means of transportation in modern society, the number of people using vehicles is increasing. Although the development of vehicle technology has the advantage of making long-distance travel easier and living more conveniently, traffic congestion often occurs in places with high population density such as Korea.

A lot of research on vehicles equipped with advanced driver assistance systems (ADAS) that actively provide information about a vehicle state, a driver state and traffic environment has been recently carried out to reduce drivers' burden and improve convenience.

For example, ADAS may provide functions such as a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

ADAS may collect information about surrounding environment and process the collected information. Also, ADAS may recognize objects and determine a route for a vehicle to travel based on a result of processing the collected information.

ADAS may collect information about surrounding environment using various sensor modules such as a camera, radar, lidar, ultrasonic sensor, etc., and fuse the data collected by each of the camera, radar, lidar, or ultrasonic sensor.

In this instance, calibration of each of the camera, radar, lidar, or ultrasonic sensor is required in ADAS, for synchronization of the data collected by each of the camera, radar, lidar, or ultrasonic sensor.

SUMMARY

An aspect of the disclosure provides an apparatus for assisting driving of a vehicle and a method thereof that may perform calibration of a camera and a lidar for synchronization between image data of the camera and lidar data of the lidar.

An aspect of the disclosure provides an apparatus for assisting driving of a vehicle and a method thereof that may perform calibration of a camera and a lidar using machine learning.

According to an aspect of the disclosure, there is provided an apparatus for assisting driving of a vehicle, the apparatus including: a camera mounted on the vehicle and configured to have a front field of view of the vehicle and acquire image data; a lidar mounted on the vehicle and configured to have a front-side field of view of the vehicle and acquire lidar data; and a controller configured to process at least one of the image data or the lidar data, wherein the controller includes a calibration matrix for correcting the image data and the lidar data and is configured to: obtain a feature map of the image data and a feature map of the lidar data using machine learning; correct the calibration matrix based on a difference between the feature map of the image data and the feature map of the lidar data; and correct the image data and the lidar data using the corrected calibration matrix.

The controller is configured to convert the lidar data into two-dimensional (2D) lidar data and convert the 2D lidar data to correspond to pixel coordinates of the image data.

The controller is configured to synchronize a size of the image data and a size of the 2D lidar data.

The controller is configured to obtain a feature map of the synchronized image data using a convolutional neural network algorithm, and obtain a feature map of the synchronized 2D lidar data using the convolutional neural network algorithm.

The controller is configured to obtain the feature map of the synchronized image data based on a convolution between the synchronized image data and a filter, and obtain the feature map of the synchronized 2D lidar data based on a convolution between the synchronized 2D lidar data and a filter.

The controller is configured to obtain a feature matrix where the feature map of the synchronized image data and the feature map of the synchronized 2D lidar data are integrated.

The controller is configured to obtain the feature matrix based on a difference between the feature map of the synchronized image data and the feature map of the synchronized 2D lidar data.

The controller is configured to obtain a correction parameter for correcting the calibration matrix from the feature matrix using the convolutional neural network algorithm.

The controller is configured to correct the image data and the lidar data using the calibration matrix corrected by the correction parameter.

According to an aspect of the disclosure, there is provided a method of assisting driving of a vehicle, the method including: acquiring image data by a camera mounted on the vehicle and configured to have a front field of view of the vehicle; acquiring lidar data by a lidar mounted on the vehicle and configured to have a front-side field of view of the vehicle; obtaining, by a processor mounted on the vehicle, a feature map of the image data and a feature map of the lidar data using machine learning; correcting a calibration matrix for correcting the image data and the lidar data, based on a difference between the feature map of the image data and the feature map of the lidar data; and correcting the image data and the lidar data using the corrected calibration matrix.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle and a driver assistance apparatus according to an embodiment;

FIG. 2 illustrates fields of view of a camera and a radar included in a driver assistance apparatus according to an embodiment;

FIG. 3 illustrates functional modules of a controller included in a driver assistance apparatus according to an embodiment;

FIG. 4 illustrates an example of a method for a driver assistance apparatus to calibrate a camera and a lidar according to an embodiment;

FIG. 5 illustrates an example where a driver assistance apparatus performs convolution of image data according to an embodiment; and FIG. 6 is a diagram illustrating convolution of image data by a driver assistance apparatus according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle a according to an embodiment. FIG. 2 illustrates fields of view of a camera and a radar included in a driver assistance apparatus according to an embodiment;

As shown in FIG. 1, a vehicle 1 includes a driving device 20, a braking device 30, a steering device 40, and/or a driver assistance apparatus 100. The above devices may communicate with each other through a vehicle communication network (NT). For example, the electric devices 20, 30, 40 and 100 included in the vehicle 1 may transmit/receive data through Ethernet, media oriented systems transport (MOST), FlexRay, controller zone network (CAN), local interconnect network (LIN), and the like.

The driving device 20 may move the vehicle 1, and include, for example, an engine, an engine management system (EMS), a transmission and a transmission control unit (TCU). The engine may generate power for driving the vehicle 1 and the EMS may control the engine in response to a driver's acceleration intention through an accelerator pedal or a request from the driver assistance apparatus 100. The transmission may decelerate and transmit the power generated by the engine to vehicle wheels, and the TCU may control the transmission in response to a driver's shift command through a shift lever and/or a request from the driver assistance apparatus 100.

The braking device 30 may stop the vehicle 1 and include, for example, a brake caliper and an electronic brake control module (EBCM). The brake caliper may decelerate or stop the vehicle 1 by using friction with a brake disc, and the EBCM may control the brake caliper in response to a driver's braking intention through a brake pedal and/or a request from the driver assistance apparatus 100. For instance, the EBCM may receive a deceleration request including a deceleration from the driver assistance apparatus 100, and control the brake caliper electrically or through hydraulic pressure to decelerate the vehicle 1 based on the requested deceleration.

The steering device 40 may include an electronic power steering control module (EPS). The steering device 40 may change a driving direction of the vehicle 1. The EPS may assist operations of the steering device 40 so that a driver may easily manipulate a steering wheel according to a driver's steering intention through the steering wheel. Also, the EPS may control the steering device 40 in response to a request from the driver assistance apparatus 100. For example, the EPS may receive a steering request including a steering torque from the driver assistance apparatus 100, and control the steering device 40 so that the vehicle 1 is steered based on the requested steering torque.

The driver assistance apparatus 100 may communicate with the driving device 20, the braking device 30, the steering device 40, a display device 50 and an audio device 60 through a vehicle communication network. The driver assistance apparatus 100 may receive route information to a destination and location information of the vehicle 1 from the navigation device, and acquire information about a driving speed, acceleration and/or angular speed of the vehicle 1 from the plurality of sensors.

The driver assistance apparatus 100 may provide a driver with a variety of functions for safety. For example, the driver assistance apparatus 100 may provide functions such as a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The driver assistance apparatus 100 may include a camera 110, a radar 120, a light detection and ranging (lidar) 130 and a controller 140. The driver assistance apparatus 100 is not limited to that illustrated in FIG. 1. For example, in the driver assistance apparatus 100 illustrated in FIG. 1, at least one of the camera 110, the radar 120 or the lidar 130 may be omitted, or various detection devices capable of detecting objects around the vehicle 1 may be added.

The camera 110, the radar 120, the lidar 130 and the controller 140 may be provided to be separated from each other. For example, the controller 140 may be installed in a housing separated from a housing of each of the camera 110, the radar 120 and the lidar 130. The controller 140 may transmit/receive data to/from the camera 110, the radar 120 or the lidar 130 through a wide bandwidth network.

The camera 110 may photograph surroundings of the vehicle 1 and acquire image data on the surroundings of the vehicle 1. For example, as shown in FIG. 2, the camera 110 may be installed on a front windshield of the vehicle 1, and have a field of view 110a facing the front of the vehicle 1.

The camera 110 may include a plurality of lens and image sensors. The image sensors may include a plurality of photodiodes converting light into an electrical signal, and the plurality of photodiodes may be arranged in a two-dimensional (2D) matrix.

The image data may include information about other vehicles, pedestrians, cyclists, or lane lines (markers distinguishing lanes on a road) located around the vehicle 1.

The camera 110 may include a graphic processor that processes the image data, and detect an object located around the vehicle 1 based on the processing of the image data. For example, the camera 110 may generate a track representing an object, using the image processing, and classify the track. For instance, the camera 110 may identify whether the track is another vehicle, a pedestrian, a cyclist, or the like.

The camera 110 may be electrically connected to the controller 140. For example, the camera 110 may be connected to the controller 140 via a vehicle communication network, a hard wire, or a printed circuit board (PCB). The camera 110 may transmit the image data (or location and classification of tracks) on the surroundings of the vehicle 1 to the controller 140.

The radar 120 may transmit a transmission wave toward the surroundings of the vehicle 1 and detect an object around the vehicle 1 based on a reflected wave reflected from the object. For instance, as shown in FIG. 2, the radar 120 may be installed in a grille or a bumper of the vehicle 1, and have a field of sensing 120a facing the front of the vehicle 1.

The radar 120 may include a transmission antenna (or a transmission antenna array) that transmits a transmission wave toward the surroundings of the vehicle 1, and a receiving antenna (or a receiving antenna array) that receives a reflected wave reflected from an object.

The radar 120 may acquire radar data from the transmission wave transmitted by the transmission antenna and the reflected wave received by the receiving antenna. The radar data may include location information (e.g., distance information) and/or speed information about other objects located in front of the vehicle 1.

The radar 120 may include a signal processor for processing the radar data, and generate a track representing an object by clustering a reflection point by the reflected wave. The radar 120 may acquire a distance of the track based on a time difference (i.e., a time taken until the wave is received after transmission) between a transmission time of the transmission wave and a reception time of the reflected wave. Also, the radar 120 may acquire a relative speed of the track based on a frequency difference between the transmission wave and the reflected wave.

For example, the radar 120 may be connected to the controller 140 via a vehicle communication network, a hard wire, or a PCB, and transmit the radar data (or the distance or relative speed of the track) to the controller 140.

The lidar 130 may transmit light (e.g., infrared rays) toward the surroundings of the vehicle 1 and detect an object around the vehicle 1 based on reflected light reflected from the object. For instance, as shown in FIG. 2, the lidar 130 may be installed on a roof of the vehicle 1, and have a field of view 130a facing all directions around the vehicle 1.

The lidar 130 may include a light source (e.g., a light emitting diode (LED), a light emitting diode array, a laser diode or a laser diode array) that emits light (e.g., infrared rays) and a light sensor (e.g., photodiode or a photodiode array) that receives the light (e.g. infrared rays). Also, as requested, the lidar 130 may further include a driving device for rotating the light source and/or the light sensor.

The lidar 130 may emit light through the light source and receive the light reflected from the object through the light sensor, while the light source and/or the light sensor rotates, thereby acquiring lidar data.

The lidar data may include a relative location (a distance to a nearby object and/or a direction of the nearby object) and/or a relative speed of the nearby object around the vehicle 1. The lidar 130 may include a signal processor capable of processing the lidar data, and generate a track representing an object by clustering a reflection point by the reflected wave. The lidar 130 may acquire a distance to the object based on a time difference (i.e., a time taken until light is received after transmission) between a light transmission time and a light reception time. Also, the lidar 130 may acquire a direction (or an angle) of the object with respect to a driving direction of the vehicle 1, based on a direction to which the light source emits the light when the light sensor receives the reflected light.

For example, the lidar 130 may be connected to the controller 140 via a vehicle communication network, a hard wire, or a PCB, and transmit the lidar data (or the relative location and relative speed of the track) to the controller 140.

The controller 140 may be electrically connected to the camera 110, the radar 120, and/or the lidar 130. Also, the controller 140 may be connected to the navigation device, the driving device 20, the braking device 30, the steering device 40, the display device 50, the audio device 60 and/or the plurality of sensors via a vehicle communication network.

The controller 140 may process the image data of the camera 110, the radar data of the radar 120 and/or the lidar data of the lidar 130, and provide a control signal to the driving device 20, the braking device 30 and/or the steering device 40.

The controller 140 may include a processor 141 and a memory 142.

The processor 141 may process the image data of the camera 110, the radar data of the radar 120 and/or the lidar data of the lidar 130. Also, the processor 141 may generate a driving signal, a braking signal and/or a steering signal for controlling the driving device 20, the braking device 30 and/or the steering device 40, respectively, based on the processing of the image data of the camera 110, the radar data of the radar 120 and/or the lidar data of the lidar 130.

For example, the processor 141 may include an image processor for processing the image data of the camera 110, and/or a signal processor for processing the radar data of the radar 120 and the lidar data of the lidar 130, and/or a micro control unit (MCU) for generating the driving signal, the braking signal and/or the steering signal.

The memory 142 may store a program and/or data for the processor 141 to process the image data, the radar data and the lidar data, and also store a program and/or data for the processor 141 to generate the driving signal, the braking signal and/or the steering signal.

The memory 142 may temporarily store the image data received from the camera 110, the radar data received from the radar 120 and/or the lidar data received from the lidar 130. Also, the memory 142 may temporarily store a processing result of the image data, the radar data and/or the lidar data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

As described above, the controller 140 may provide the driving signal, braking signal, or steering signal, based on the image data of the camera 110, the radar data of the radar 120 and/or the lidar data of the lidar 130.

Operations of the driver assistance apparatus 100 are described in detail below.

FIG. 3 illustrates functional modules of a controller included in a driver assistance apparatus according to an embodiment.

Functionally, the controller 140 may include a perception module 146 for collecting information about the vehicle 1 and/or objects around the vehicle 1, a decision module 147 for generating a detailed route to avoid a collision with the objects around the vehicle 1, and a control module 148 for controlling the vehicle 1 to travel along the generated detailed route. Each of the perception module 146, the decision module 147 and the control module 148 may be a hardware module (e.g., application specific integrated circuit (ASIC) or field-programmable gate array (FPGA)) included in the processor 141, or a software module (e.g., an application program or data) stored in the memory 142.

The perception module 146 of the controller 140 may include a sensor fusion 146a that detects the objects around the vehicle 1 by a fusion of the image data of the camera 110, the radar data of the radar 120 and the lidar data of the lidar 130.

For example, the controller 140 may detect the objects around the vehicle 1 (e.g., other vehicles, pedestrians, cyclists, etc.) based on the image data of the camera 110, the radar data of the radar 120 and the lidar data of the lidar 130.

The controller 140 may acquire a relative location (an angle with respect to a driving direction) and/or type (e.g., whether an object is another vehicle, a pedestrian, a cyclist, or the like) of the object around the vehicle 1, based on the image data of the camera 110. The controller 140 may acquire a relative location (a distance from the vehicle) and/or a relative speed of the object around the vehicle 1, based on the radar data of the radar 120. The controller 140 may acquire a relative location (a distance from the vehicle and/or an angle with respect to a driving direction) and/or a relative speed of the object around the vehicle 1, based on the lidar data of the lidar 130. Also, the controller 140 may match the object detected by the radar data and/or the lidar data and the object detected by the image data, and acquire the type, relative location, and/or relative speed of the object around the vehicle 1 based on a result of matching.

Also, the controller 140 may acquire information about lanes of a road on which the vehicle 1 travels, based on the image data of the camera 110. For example, the controller 140 may identify a lateral location of the lane.

The perception module 146 may include a localization 146b that identifies a location of the vehicle 1 based on the image data of the camera 110, the lidar data of the lidar 130, map data and/or location data of the vehicle 1.

For example, the controller 140 may identify a landmark around the vehicle 1 from the map data based on the location data of the vehicle 1. The controller 140 may identify a relative location of the landmark with respect to the vehicle 1, based on the image data and the lidar data. The controller 140 may correct the location data of the vehicle 1, based on absolute coordinates of the landmark based on the map data and relative coordinates based on the image data and/or the lidar data. In other words, the controller 140 may identify absolute coordinates of the vehicle 1.

The perception module 146 may include a map projection 146c that projects the vehicle 1 and/or the objects around the vehicle 1 onto the map data.

For example, the controller 140 may project the vehicle 1 onto the map data based on the corrected location data of the vehicle 1, and project the objects around the vehicle 1 onto the map data based on the relative locations and/or relative speeds of the objects around the vehicle 1.

The decision module 147 of the controller 140 may include a collision risk decision 147a that predicts a collision with the objects around the vehicle 1 based on the relative locations and relative speeds of the objects around the vehicle 1 and identifies a collision risk.

For example, the controller 140 may calculate a time to collision (TTC) (or a distance to collision (DTC)) between the vehicle 1 and the object around the vehicle 1, based on the relative locations (distance and/or direction) and relative speeds of the objects around the vehicle 1. Also, the controller 140 may identify the collision risk with the object around the vehicle 1 based on the TTC or the DTC.

The decision module 147 may include a target selection 147b that selects a target for collision avoidance or a target for following.

For example, in autonomous emergency braking, the controller 140 may select, as a target, a nearby object having a highest risk of collision (or having a shortest time to collision) based on the collision risk (or the time to collision). Also, in adaptive cruise control, the controller 140 may select, as a target, a preceding vehicle that travels in the same lane as the vehicle 1.

The decision module 147 may include a path generation 147c that generates a detailed path for avoiding collision with the target or a detailed path for reaching a destination.

For example, the controller 140 may generate a detailed path for maintaining a lane to follow the target or a detailed path for changing a lane for collision avoidance.

The control module 148 of the controller 140 may include a driving control 148a for controlling the driving device 20, a braking control 148b for controlling the braking device 30, and a steering control 148c for controlling the steering device 40.

The controller 140 may generate a driving signal, a braking signal or a steering signal for following a target or avoiding a collision with a target. For instance, the controller 140 may transmit, to the driving device 20 and/or the braking device 30, the driving signal and/or the braking signal for allowing a distance to a target (or a time taken to reach a location of a preceding vehicle) to be a distance set by a driver. Also, the controller 140 may transmit, to the braking device 30 and/or the steering device 40, the braking signal and/or the steering signal for avoiding a collision with a target.

As described above, the driver assistance apparatus 100 may fuse the image data of the camera 110, the radar data of the radar 120 and the lidar data of the lidar 130, thereby detecting and identifying the objects around the vehicle 1.

The driver assistance apparatus 100 may synchronize the image data of the camera 110, the radar data of the radar 120 and the lidar data of the lidar 130 in order to fuse the image data of the camera 110, the radar data of the radar 120 and the lidar data of the lidar 130.

In particular, the driver assistance apparatus 100 may perform calibration of the camera 110 and the lidar 130, respectively, to synchronize the image data of the camera 110 and the lidar data of the lidar 130.

Conventionally, calibration may be performed by a person using a checkerboard (or a marker).

In a conventional calibration method using a checkerboard, a size of checkerboard is too big, a space for calibration is required, a user is unable to perform calibration alone, and calibration may not be performed automatically at any desired time. That is, the conventional calibration method for camera and lidar may be performed for the first time when a vehicle is released. Also, when a camera and lidar are misaligned due to shock or vibration of the vehicle, calibration is required to be performed in a repair shop or a factory, and thus normal functions of the camera and lidar may not be used until delivered to the repair shop or factory.

However, the driver assistance apparatus 100 may perform calibration of each of the camera 110 and the lidar 130 using machine learning, while the vehicle 1 is travelling.

FIG. 4 illustrates an example of a method for a driver assistance apparatus to calibrate a camera and a lidar according to an embodiment. FIG. 5 illustrates an example where a driver assistance apparatus performs convolution of image data according to an embodiment. FIG. 6 is a diagram illustrating convolution of image data by a driver assistance apparatus according to an embodiment.

Referring to FIGS. 4, 5 and 6, a method 1000 for the driver assistance apparatus 100 to perform calibration of the camera 110 and the lidar 130 is described.

The driver assistance apparatus 100 may acquire image data of the camera 110 and lidar data of the lidar 130 (1010).

The camera 110 may photograph surroundings of the vehicle 1 and acquire image data. The lidar 130 may also photograph the surroundings of the vehicle 1 and acquire lidar data.

The controller 140 may acquire the image data and the lidar data from the camera 110 and the lidar 130, respectively.

The driver assistance apparatus 100 may correct the image data of the camera 110 and the lidar data of the lidar 130 using a calibration parameter (1020).

The controller 140 may include a calibration matrix for calibrating each of the image data of the camera 110 and the lidar data of the lidar 130.

For instance, the calibration parameter may include a matrix for correcting the image data of the camera 110 and a matrix for correcting the lidar data of the lidar 130, based on a result of the calibration using the checkerboard (or marker). The calibration matrix may include a matrix for parallel movement of the image data or the lidar data or a matrix for rotational movement of the image data or the lidar data.

As described above, the calibration matrix may include an intrinsic matrix for correcting distortion due to an internal influence of each of the camera 110 and the lidar 130.

In addition, the calibration matrix may include a calibration matrix for fusing the image data of the camera 110 and the lidar data of the lidar 130. For example, the calibration matrix may include an extrinsic matrix for correcting a difference in installation location of the camera 110 and the lidar 130.

The controller 140 may correct each of the image data and the lidar data, by applying the intrinsic matrix and the extrinsic matrix to each of the image data and the lidar data.

The driver assistance apparatus 100 may convert the lidar data into two-dimensional (2D) data and convert coordinates of the 2D data (1030).

The lidar data may include a relative location (a distance to and/or direction of an object around the vehicle 1) of the object around the vehicle 1. That is, the lidar data may include three-dimensional (3D) data including a distance between the vehicle 1 and the object around the vehicle 1.

The controller 140 may convert the lidar data which is 3D data to 2D lidar data. That is, the controller 140 may render the 2D lidar data from the 3D lidar data. For example, the controller 140 may acquire the 2D lidar data by projecting the 3D lidar data on a specific plane.

Also, the controller 140 may convert the 2D lidar data converted from the 3D lidar data to correspond to pixel coordinates of the image data of the camera 110. Specifically, the controller 140 may include a transformation matrix for converting the 2D lidar data into a pixel coordinate system of the image data, and convert the 2D lidar data into the pixel coordinate system using the transformation matrix. The transformation matrix may include a matrix for parallel moving an object of the 2D lidar data or a matrix for rotating the object of the 2D lidar data.

The driver assistance apparatus 100 may synchronize sizes of the image data and the 2D lidar data (1040).

As shown in FIG. 2, the lidar 130 is installed at a position different from the camera 110. Accordingly, when a single object is photographed by the camera 110 and the lidar 130, respectively, a size of the object in 2D lidar data may be different from that of the object in image data. The controller 140 may enlarge or reduce the size of the image data or the 2D lidar data to synchronize the sizes of the image data and the 2D lidar data. For example, the controller 140 may enlarge or reduce the size of the 2D lidar data using a matrix for enlarging or reducing the object of the 2D lidar data.

Also, as show in FIG. 2, the field of view 130a of the lidar 130 is larger than the field of view 110a of the camera 110. The controller 140 may cut the 2D lidar data to synchronize the image data and the 2D lidar data. For example, the controller 140 may exclude a portion of the 2D lidar data to correspond to the field of view 110a of the camera 110.

According to the operations described above, the 2D lidar data of the lidar 130 may correspond to the image data of the camera 110.

The driver assistance apparatus 100 may obtain a feature map from each of the image data and the 2D lidar data (1050).

The controller 140 may obtain the feature map from each of the image data and the 2D lidar data using machine learning.

For example, the controller 140 may obtain the feature map from each of the image data and the 2D lidar data using a convolutional neural network (CNN). The CNN is a widely used algorithm for identifying or classifying an object from image data.

In general, the CNN may include a feature extraction for extracting a feature map of an image and a classification for classifying (or identifying) an object based on the extracted feature map.

The controller 140 may obtain the feature map of the image data and the feature map of the 2D lidar data using the feature extraction of the CNN.

As shown in FIG. 5, convolution and pooling may be repeated in the feature extraction.

The convolution is a process of applying a filter (or a filter matrix) to the image data (image matrix). As shown in FIGS. 6A and 6B, each of the image data and the filter may have a matrix form. While the filter matrix traverses the image matrix at predetermined intervals, the controller 140 may perform convolution of the image matrix and the filter matrix. For instance, the controller 140 may acquire values obtained by multiplying values of the filter matrix and corresponding values of the image matrix, and obtain a sum of the acquired values.

The feature map may be obtained by the convolution between the image data and the filter. The controller 140 may obtain the feature map by the image data and the feature map by the 2D lidar data.

The pooling is a process of reducing a size of the feature map to reduce an associative load of the processor 141. Also, specific data of the feature map may be emphasized by pooling.

One of a max pooling to obtain a maximum value in a specific region, an average pooling to obtain an average value in a specific region or a mini pooling to obtain a minimum value in a specific region may be used. For example, the controller 140 may perform the max pooling to obtain a maximum value in an adjacent 2*2 region of the feature map.

The controller 140 may obtain the feature map of the image data by repeatedly performing convolution and pooling of the image data, and obtain the feature map of the 2D lidar data by repeatedly performing convolution and pooling of the 2D lidar data.

The driver assistance apparatus 100 may integrate the feature map of the image data and the feature map of the 2D lidar data (1060).

For instance, the controller 140 may obtain the feature map based on a matrix difference between the feature map of the image data and the feature map of the 2D lidar data. Specifically, the controller 140 may perform a matrix subtraction between the feature map of the image data and the feature map of the 2D lidar data, thereby obtaining a feature matrix.

The driver assistance apparatus 100 may correct the calibration matrix based on the integrated feature map (1070).

The controller 140 may correct the calibration matrix based on the feature matrix using machine learning. For example, the controller 140 may obtain a parameter for correcting the calibration matrix from the feature matrix, using the CNN.

The controller 140 may obtain the feature map of the feature matrix using the feature extraction of the CNN. The controller 140 may obtain the parameter for correcting the calibration matrix by applying the feature map of the feature matrix to the classification of the CNN.

The classification of the CNN may consist of a neural network.

The neural network may include an input layer where image data is input, an output layer where information about an identified object is output, and a hidden layer between the input layer and the output layer. The input layer may include a plurality of input nodes to which a luminance value of a pixel of an image is input, respectively. The hidden layer may include a plurality of hidden nodes to which values obtained by applying first weights to values of the plurality of input nodes are input, respectively. The output layer may include a plurality of output nodes to which values obtained by applying second weights to values of the plurality of hidden nodes are input, respectively.

The controller 140 may obtain the parameter for correcting the calibration matrix based on the values of the plurality of output nodes.

The controller 140 may correct the calibration matrix using the obtained parameter. Also, the controller 140 may correct each of the image data and the lidar data using the image data and the lidar data using the corrected calibration matrix.

As described above, the driver assistance apparatus 100 may perform calibration of each of the camera 110 and the lidar 130 using machine learning. Accordingly, the driver assistance apparatus 100 may correct misalignment of the camera 110 and the lidar 130 due to vibration of the vehicle 1 during driving, using the calibration using machine learning.

As is apparent from the above, according to the embodiments of the disclosure, the apparatus for assisting driving of a vehicle and the method thereof can perform calibration of a camera and a lidar for synchronization between image data of the camera and lidar data of the lidar.

The apparatus for assisting driving of a vehicle and the method thereof can perform calibration of a camera and a lidar using machine learning.

Accordingly, the apparatus for assisting driving of a vehicle and the method thereof can correct a difference between the image data of the camera and the lidar data of the lidar that occurs during driving, using machine learning.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

The computer-readable code may be provided in the form of a non-transitory storage medium. Here, when a storage medium is referred to as "non-transitory", it can be understood that the storage medium is tangible and does not include a signal (e.g., an electromagnetic wave), but rather that data is semi-permanently or temporarily stored in the storage medium. For example, the "non-transitory storage medium" may include a buffer in which data is temporarily stored.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An apparatus for assisting driving of a vehicle, the apparatus comprising:

a camera mounted on the vehicle and configured to have a front field of view of the vehicle and acquire image data;

a lidar mounted on the vehicle and configured to have a front-side field of view of the vehicle and acquire lidar data; and a controller configured to process at least one of the image data or the lidar data, wherein the controller comprises a calibration matrix configured to correct the image data and the lidar data and wherein the controller is configured to:

obtain a feature map of the image data and a feature map of the lidar data using machine learning;

correct the calibration matrix based on a difference between the feature map of the image data and the feature map of the lidar data; and correct the image data and the lidar data using the corrected calibration matrix.

2. The apparatus of claim 1, wherein the controller is configured to convert the lidar data into two-dimensional (2D) lidar data and convert the 2D lidar data to correspond to pixel coordinates of the image data.

3. The apparatus of claim 2, wherein the controller is configured to synchronize a size of the image data and a size of the 2D lidar data.

4. The apparatus of claim 3, wherein the controller is configured to obtain a feature map of the synchronized image data using a convolutional neural network algorithm, and obtain a feature map of the synchronized 2D lidar data using the convolutional neural network algorithm.

5. The apparatus of claim 4, wherein the controller is configured to obtain the feature map of the synchronized image data based on a convolution between the synchronized image data and a filter, and obtain the feature map of the synchronized 2D lidar data based on a convolution between the synchronized 2D lidar data and a filter.

6. The apparatus of claim 4, wherein the controller is configured to obtain a feature matrix where the feature map of the synchronized image data and the feature map of the synchronized 2D lidar data are integrated.

7. The apparatus of claim 6, wherein the controller is configured to obtain the feature matrix based on a difference between the feature map of the synchronized image data and the feature map of the synchronized 2D lidar data.

8. The apparatus of claim 6, wherein the controller is configured to obtain a correction parameter for correcting the calibration matrix from the feature matrix using the convolutional neural network algorithm.

9. The apparatus of claim 8, wherein the controller is configured to correct the image data and the lidar data using the calibration matrix corrected by the correction parameter.

10. A method of assisting driving of a vehicle, the method comprising:

acquiring image data by a camera mounted on the vehicle and configured to have a front field of view of the vehicle;

acquiring lidar data by a lidar mounted on the vehicle and configured to have a front-side field of view of the vehicle;

obtaining, by a processor mounted on the vehicle, a feature map of the image data and a feature map of the lidar data using machine learning;

correcting a calibration matrix for correcting the image data and the lidar data, based on a difference between the feature map of the image data and the feature map of the lidar data; and correcting the image data and the lidar data using the corrected calibration matrix.

11. The method of claim 10, wherein the obtaining of the feature map of the image data and the feature map of the lidar data comprises:

converting the lidar data into 2D lidar data; and converting the 2D lidar data to correspond to pixel coordinates of the image data.

12. The method of claim 11, wherein the obtaining of the feature map of the image data and the feature map of the lidar data comprises synchronizing a size of the image data and a size of the 2D lidar data.

13. The method of claim 12, wherein the obtaining of the feature map of the image data and the feature map of the lidar data comprises:

obtaining a feature map of the synchronized image data using a convolutional neural network algorithm; and obtaining a feature map of the synchronized 2D lidar data using the convolutional neural network algorithm.

14. The method of claim 13, wherein the obtaining of the feature map of the image data and the feature map of the lidar data comprises:

obtaining the feature map of the synchronized image data based on a convolution between the synchronized image data and a filter; and obtaining the feature map of the synchronized 2D lidar data based on a convolution between the synchronized 2D lidar data and a filter.

15. The method of claim 13, wherein the obtaining of the feature map of the image data and the feature map of the lidar data comprises obtaining a feature matrix where the feature map of the synchronized image data and the feature map of the synchronized 2D lidar data are integrated.

16. The method of claim 15, wherein the obtaining of the feature map of the image data and the feature map of the lidar data comprises obtaining the feature matrix based on a difference between the feature map of the synchronized image data and the feature map of the synchronized 2D lidar data.

17. The method of claim 15, wherein the obtaining of the feature map of the image data and the feature map of the lidar data comprises obtaining a correction parameter for correcting the calibration matrix from the feature matrix using the convolutional neural network algorithm.

18. The method of claim 17, wherein the obtaining of the feature map of the image data and the feature map of the lidar data comprises correcting the image data and the lidar data using the calibration matrix corrected by the correction parameter.

19. A non-transitory computer-readable recording medium storing a program for implementing the method of claim 10.

\* \* \* \* \*